Dec. 11, 1928.

H. K. SCHRAGE 1,694,985

SPEED CONTROL OF INDUCTION MOTORS

Original Filed April 8, 1925

Inventor:
Hidde K. Schrage
by
His Attorney

Patented Dec. 11, 1928.

1,694,985

UNITED STATES PATENT OFFICE.

HIDDE K. SCHRAGE, OF PARIS, FRANCE, ASSIGNOR TO GENERAL ELECTRIC COMPANY, A CORPORATION OF NEW YORK.

SPEED CONTROL OF INDUCTION MOTORS.

Original application filed April 8, 1925, Serial No. 21,662, and in France June 20, 1924. Divided and this application filed September 9, 1927. Serial No. 218,546.

This application is a division of my application Serial No. 21,662, filed April 8, 1925.

My invention relates to systems wherein the speed of an induction motor is controlled by variation in the magnitude of a regulating voltage applied to its secondary circuit either through a regulating winding forming a part of the motor, or through a regulating machine interconnected with the motor, and has for its object the provision of an improved arrangement for controlling the commutation of the regulating machine or winding in a manner to render possible the utilization of regulating voltages higher than those heretofore used for this purpose.

It is well known that the speed of an induction motor can be regulated by means of a variable voltage applied to its secondary circuit, and that the limit to which the regulating voltage can be increased is dependent on the commutation characteristics of the regulating winding or machine through which this voltage is applied to the secondary circuit of the motor. If the motor be supplied with current at a frequency of 60 cycles, for example, difficulty is encountered, when the voltage at the commutator of the regulating winding or machine exceeds 45 or 50 volts, due to the large commutator and great number of commutator brushes required to transmit the large regulating currents required at these voltages. In accordance with my invention, provision is made for suppressing the field flux in the commutation zone of the regulating winding or machine.

My invention will be better understood from the following description when considered in connection with the accompanying drawing and its scope will be pointed out in the appended claims.

Figure 1:
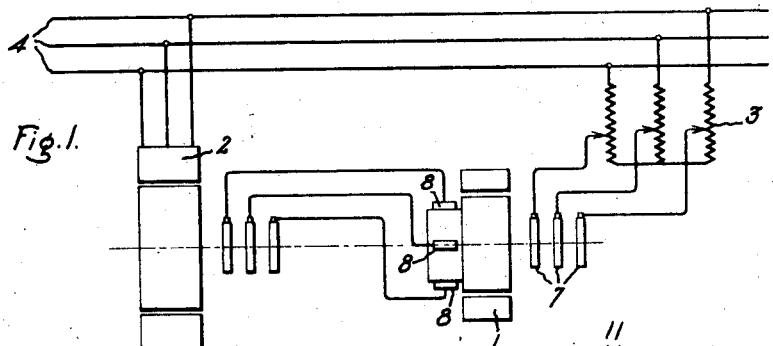
Figure 2:
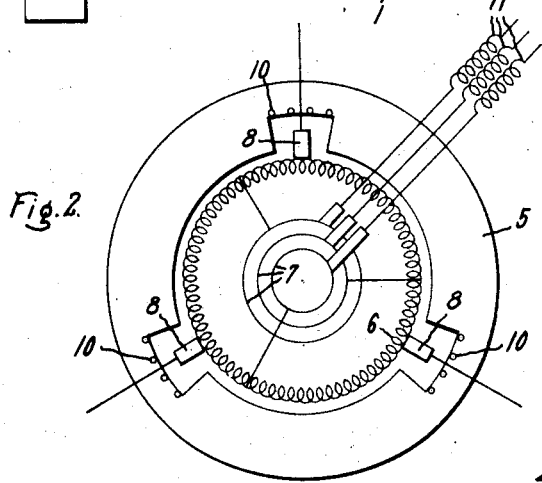
Figure 3:
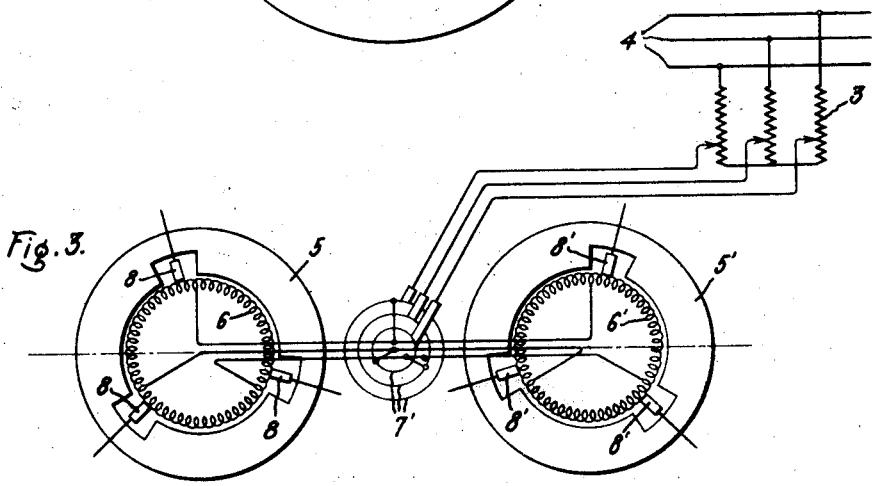

Referring to the drawings, Fig. 1 shows a speed control arrangement in which my invention may be embodied; Fig. 2 shows details of construction of the commutator regulating machine; and Fig. 3 shows the invention applied to a two-part commutator regulating apparatus.

Fig. 1 shows a speed control aggregate or system wherein a regulating machine 1 is provided with a commutator, the brushes 8 of which are interconnected with the secondary circuit of an induction motor 2 and the slip rings 7 of which are connected through a transformer 3 to a polyphase line 4 from which current is supplied to the primary circuit of the motor 2.

Assuming the motor 2 and regulating machine 1 to have the same number of poles and to be operated at the same speed, the transformer 3 may be adjusted in a well known manner to vary the voltage applied to the secondary circuit of the motor by the frequency changer or regulating machine 1. As indicated above, the upper limit of the regulating voltage is rather low unless special means are provided for improving the commutation of the regulating winding or machine. Thus, assuming the rotor winding of the regulating machine to be a multiple winding with one turn per commutator bar, the voltage per bar, hereinafter designated as $e$ is equal to $$\pi\sqrt{2}f\phi 10^{-8} = \pi\sqrt{2}(f_1+f_2)\phi 10^{-8},$$

where $f=$ the frequency of the polyphase line 4, $f_1=$ the speed of the motor, $f_2=$ the slip frequency of the motor, and $\phi=$ the flux embraced by a turn of the regulating machine rotor winding. It will be readily understood that this voltage is dependent both on the speed at which the winding or machine is rotated and on the rotational speed of the field flux. The voltage per commutator bar may therefore be divided into a component $$e_1 = \pi\sqrt{2}f_1\phi 10^{-8}$$

representing the part of the total voltage $e$ produced by rotation of the regulating winding or machine and a component $$e_2 = \pi\sqrt{2}f_2\phi 10^{-8}$$

due to rotation of the field flux.

If no means are provided for limiting the field flux in the commutating zone of the regulating machine or winding, the total voltage $e$, which is equal to $e_1+e_2$, is necessarily limited to a value at which good commutation is realized. It is possible, however, to suppress the field in the commutating zone by slotting the stator field structure at points adjacent the commutated conductors of the regulating winding or machine. In this manner, the component voltage $e_1$ in the commutating zone may be suppressed and both the flux $\phi$ and the voltage $e$ may be increased in proportion to the quotient obtained by dividing $f_2$ into $f$. Thus assuming a speed regulation of plus and minus 30% and current to be supplied to the motor at 50 cycles, it is possible to raise the voltage at the commutator of the regulating machine from 45 volts to $(100 \times 45) \div 30 = 150$ volts and to reduce the size of the commutator and the number of commutator brushes accordingly.

Fig. 2 shows certain details of a frequency changer or regulating machine wherein a stator member 5 is slotted at points adjacent the commutating zones of a rotor winding 6 connected to slip rings 7 and to commutator brushes 8. As indicated by Fig. 1, the brushes 8 may be connected to the secondary circuit of the motor 1 and the slip rings 7 may be connected to the line 4 through the transformer 3. Damper windings may be placed in the slots of stator member 5 in order more effectively to suppress the flux in the zone of commutation. While the winding 6 is diagrammatically shown in Fig. 2 as a ring winding, it will be evident that this winding usually will be of the drum type and that, in the case of three phase machines, it may be wound with a pitch of 120 electrical degrees. In order to minimize deformation of the regulating machine field by the slots in the rotor structure, it is desirable that these slots be made as small as is consistent with good commutation. Inductance coils 11 may be connected between the slip rings 7 and the transformer shown at 3 in Fig. 1 to minimize the effects of harmonics resulting from deformation of the field.

Fig. 3 shows a regulating element comprising two frequency changers coupled to the same shaft and connected to have current transmitted between their rotor windings 6 and 6' and the line 4 through a single set of slip rings 7'. In utilizing the regulating element of Fig. 3 to control the secondary voltage of the motor 2, it is necessary that the secondary windings be independent of one another, or, in other words, to provide the motor with six slip rings, as shown for example in Fig. 1 of British Patent 16,559 of 1909, each connected to a different terminal of the three phase secondary winding.

Assuming the brushes 8 and 8' to be in corresponding positions on the windings 6 and 6' respectively, and the corresponding brushes of the two machines to be connected to opposite ends of the same secondary windings, the regulating voltage may be varied by shifting the stator 5 and brushes 8 in one direction while shifting the stator 5' and brushes 8' in the opposite direction and through an angle equal to that through which the brushes 8 and the stator 5 are shifted. The power factor of the motor 2 may be controlled by shifting the stators and brushes of the two machines in opposite directions through unequal angles.

The embodiments of the invention illustrated and described herein have been selected for the purpose of clearly setting forth the principles involved. It will be apparent, however, that the invention is susceptible of being modified, in many ways, to meet the different conditions encountered in its use and I therefore aim to cover in the appended claims all modifications within the true spirit and scope of my invention.

What I claim as new and desire to secure by Letters Patent of the United States, is:

1. An induction motor speed control system comprising a wound secondary induction motor, a commutator machine for supplying a regulating voltage to the secondary of said motor, said machine having a stator core member with slots opposite the commutating zones of said machine, and having commutating brushes in fixed relation with said stator member, said stator and brushes being adjustable for varying the phase of the excitation supplied to the secondary of said motor.

2. In a speed control system, a commutator type dynamo electric machine provided with a rotor winding connected to a commutator, a stator core member having slots opposite the commutating zones of said rotor member, brushes in fixed relation with said stator member bearing on said commutator, said stator and brushes being adjustable, and a damper winding in the slots of said stator member.

In witness whereof, I have hereunto set my hand this 24th day of August 1927.

HIDDE K. SCHRAGE.